No. 864,988. PATENTED SEPT. 3, 1907.
F. RAVEN.
MILKING MACHINE AND CONNECTIONS.
APPLICATION FILED JUNE 11, 1907.
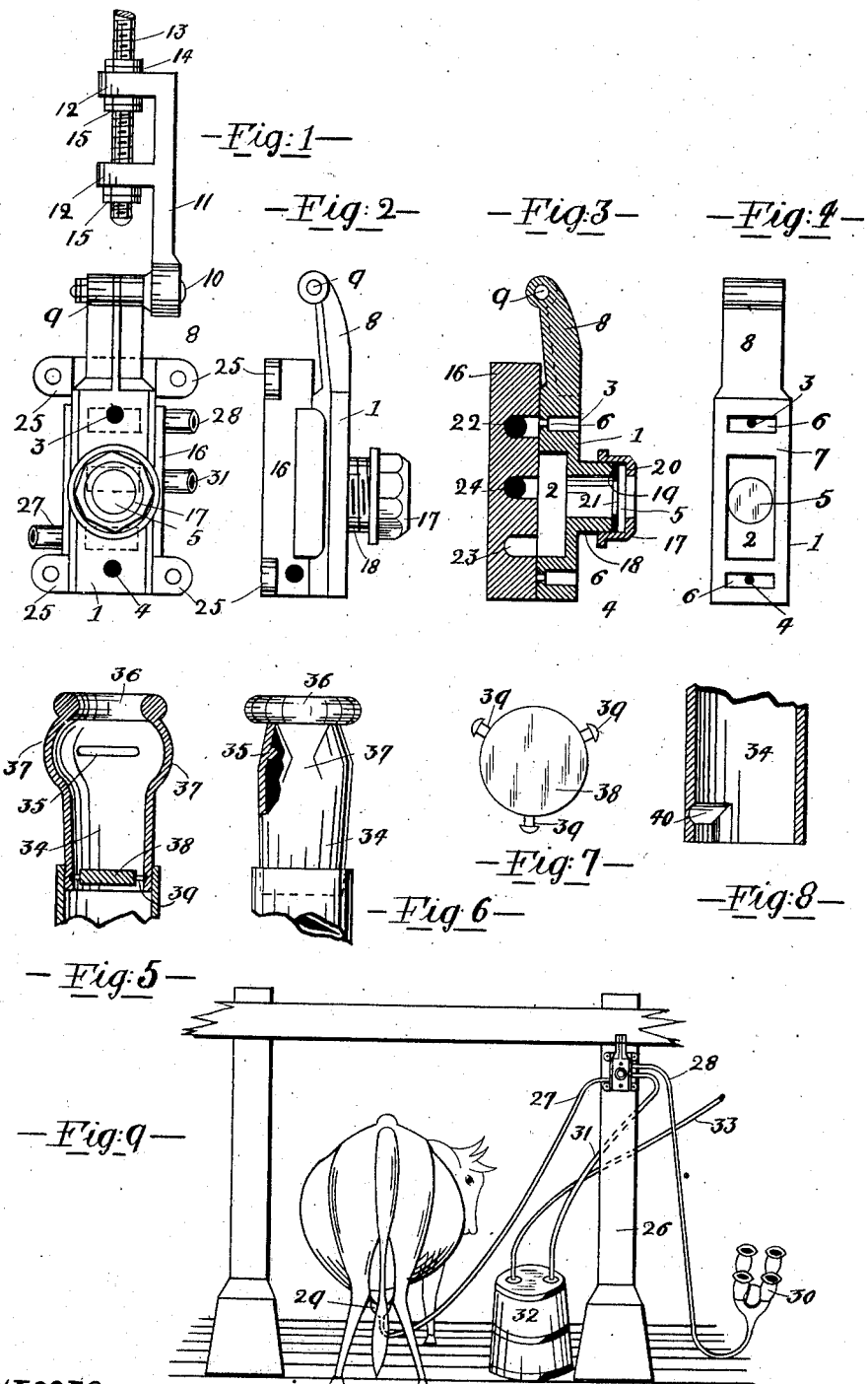

UNITED STATES PATENT OFFICE.

FREDERICK RAVEN, OF KORRUMBURRA, VICTORIA, AUSTRALIA.

MILKING-MACHINE AND CONNECTIONS.

No. 864,988. Specification of Letters Patent. Patented Sept. 3, 1907.

Application filed June 11, 1907. Serial No. 378,370.

*To all whom it may concern:*

Be it known that I, FREDERICK RAVEN, a British subject, residing at Korrumburra, in the State of Victoria, Commonwealth of Australia, have invented certain new and useful Improvements in Milking-Machines and Connections, of which the following is a specification.

The object of my invention is to simplify and improve milking machines and teat cups used therewith. By reference to the accompanying sheet of drawings the invention will be clearly understood.

Throughout the drawings the figures represent like parts.

Figure 1 is a vertical front elevation of the sliding pulsator valve upon its bed or body, constituting the first part of my invention, an adjusting link and a portion of the eccentric rod connection are also shown. Fig. 2 is a vertical side elevation of Fig. 1 but without the adjusting link and eccentric rod connection. Fig. 3 is a vertical sectional view of Fig. 2 showing the interior form of the said pulsator valve and the valve bed or body for same. Fig. 4 is an elevation of said pulsator valve face. Fig. 5 is a side sectional view of my teat cup and its combination of parts constituting the second part of my present invention. Fig. 6 is an end elevation partly in section of Fig. 5 showing the sectional view of one of the two horizontal grip ribs contained within each of said teat cups. Fig. 7 is an enlarged plan or view of the baffle disk or plate (removed) and three equi-distant bayonet catches around its rim. Fig. 8 is also an enlarged partial view of one of the three grooves in which the said bayonet catches slide when introduced into said teat cup. Fig. 9 is a general view of the position and arrangement of the essential parts of my invention and connections in practice. In this view two sets of teat cups are shown one being enlarged for clearness of illustration.

In the drawings (1) represents the pulsator valve rectangularly shaped and provided with the vacuum and milk-suction chamber (2), two atmospheric inlets (3) and (4) and the spy or milk inspection glass, (5). Through said pulsator valve (1) are made the said air-inlets (3) and (4) the inner ends of which are extended into transverse grooves (6) made nearly across the face (7) of the pulsator valve (1) as shown in Figs. 3 and 4. Said pulsator valve (1) carries the rib arm (8) having the eye (9) which is connected with the horizontal pin (10) projected from the adjusting link, 11, carrying the two lugs (12) each of which is bored to receive the screw threaded end portion of the vertically reciprocated eccentric rod (13). Upon this rod are placed the fast and lock nuts (14) and (15) in order that the pulsator valve (1) may be conveniently adjusted to slide upon the faced body or bed (16) herein described. Said pulsator valve is provided with the aforesaid spy or milk inspection glass (5) fixed within the flanged and octagonally shaped cap (17) which is screw threaded internally to fit upon the screw threaded spigot (18) projected from said pulsator valve (1). The end of said spigot forms a faced shoulder (19) between which and the faced inner circular shoulder (20) of the cap (17) are placed the india-rubber washer (21) and the glass spy (5). The before mentioned pulsator valve bed (16) has four ears or lugs (25) at each of its corners so that said bed may be securely fixed by screws to the vertical post (26) as shown in Fig. 9. Said pulsator valve bed (16) has also three ports (22), (23) and (24), the ports (22) and (23) and tubing (27) and (28) are connected with the two sets of teat cups (29) and (30) respectively, and the other port (24) communicates with the tubing (31) and sealed milk bucket (32), while the vacuum tubing (33) is connected with said bucket and a common double acting vacuum pump not shown in the drawings as its purpose and operation are both well understood.

The teat cup as shown at Figs. 5 and 6 consists of the india rubber casing or shell (34) and is formed solid with the two teat grip ribs (35) projected one opposite to the other near the upper internal side portions of said teat cup while the upper part of said casing is formed into a circular ring (36) which serves as the mouth piece whereby the teat cup may fit well up against the cow's udder. The bulged out parts (37) of the teat cup render it somewhat pear-shaped as at Fig. 5 so as to provide end air compression spaces for the quick intermittent induction of atmospheric air after the vacuum in such cup has been destroyed.

(38) is the baffle disk or plate which is made about one fourth of an inch less in diameter than the internal diameter of the lower portion of said teat cup and is provided with three bayonet catches similar to (39) shown in Figs. 5 and 7. These bayonet catches fit tightly in the inverted L shaped grooves (40) (Fig. 8) so as to hold said baffle disk or plate (38) in position, and at the same time allow of the latter being removed when required. It may be here explained that the parts comprising the pulsator valve (1) and bed or body (16) are made of brass or gun metal while the teat cups and tubing consist of flexible rubber.

The operation of the several essential parts of my said invention is as follows:—The two milking tubes (27) and (28) are first connected with the ports (22) and (23) and the vacuum tubing (31) with the other or central port (24) of the body (16) and the milk bucket (32), while the tubing (33) is connected with said bucket (32) and the vacuum pump. The two sets of teat cups are then placed upon the cow's teats and the machine set going. This is effected by the employment of an oil or other suitable engine to work a driving shaft which carries an eccentric to vertically reciprocate the eccentric rod (13). The vertical stroke of this rod imparts a vertical sliding motion to said pulsator valve (1) which moves across the ports (22), (23) and (24). When the valve is on its down stroke the vacuum from the pump acts upon the first set (29) of the teat cups and during this down stroke period the milk is sucked or drawn from the teats up to the bottom port (23) thence into the chamber (2) of the pulsator valve (1) where it can be seen by looking through the spy glass (5) thereby allowing the attendant to ascertain whether or not the cow is stripped. During the same down stroke period the atmospheric air is admitted through the top air inlet (3) of the pulsator valve (1) top port (22) of the body (16) tubing (28) and cups (30), thereby destroying the vacuum therein and at the same time releasing momentarily the pulsated grip of the second set (30) of teat cups. The upward stroke of the said pulsator valve (1) also delivers by suction the milk from said chamber (2) into the central port (24), thence into the vacuum tube (31) through which it runs to the milk bucket (32) simultaneously by allowing the atmospheric air to enter the lower port (23) and milk tube (27) for the purpose of destroying the vacuum in the first set (29) of teat cups, in which case, and at this juncture the vacuum acts upon the second set (30) of teat cups drawing the milk therefrom into the top port (22) and chamber (2) of pulsator valve, thereby delivering it to said central port (24) tubing (31) and into the milk bucket. In this manner an alternate pulsated grip suction and release take place within and upon the first and second sets of teat cups and should any back flow of milk occur in the teat cups during the process of milking the baffle disk or plate (38) sprays or deflects the milk on to the annular wall of the teat cups, thereby preventing said back-flow from irritating the teats of the cow.

I claim:

1. In a milking machine as herein described the combination and arrangement of the pulsator valve (1) having the chamber (2) and the atmospheric air inlets (3) and (4), arm (8), and the spy or milk inspection glass (5) with the bed or body (16) provided with the ports (22), (23) and (24) as and for the purpose specified.

2. In a milking machine as herein described the combination and arrangement with the pulsator valve (1) having the chamber (2) and atmospheric air inlets (3) and (4) of the spy or milk inspection glass (5), cap (17) and spigot (18) as and for the purpose specified.

3. In a milking machine as herein described, the combination and arrangement of a pulsator valve (1), bed or body (16) and tubing (27), (28), (31) and (33) forming the milk and vacuum connections with the pulsator valve (1), bed or body (16) teat cups (34) milk bucket (32) and the double acting vacuum pump as and for the purpose specified.

4. The combination of the teat cup having interior inverted L shaped grooves, a baffle disk, bayonet catches on said disk adapted to engage with the groove and flexible tube connections for the cup.

5. The combination of the teat cup having two grip ribs on its interior wall, a circular mouth piece on the cup, said cup having two bulged out parts 37 and a baffle disk carried by the cup.

In witness whereof I have hereunto set my hand in presence of two witnesses.

FREDERICK RAVEN.

Witnesses:
JONATHAN BEAR,
LESLIE LAWTON BEAR.